INVENTOR.
SAMSON C. GELERNTER
BY Herbert L. Davis
ATTORNEY

INVENTOR.
SAMSON C. GELERNTER
BY Herbert L. Davis
ATTORNEY

INVENTOR.
SAMSON C. GELERNTER
BY Herbert L. Davis
ATTORNEY

INVENTOR.
SAMSON C. GELERNTER
BY Herbert L. Davis
ATTORNEY

INVENTOR.
SAMSON C. GELERNTER
BY Herbert L. Davis
ATTORNEY

INVENTOR.
SAMSON C. GELERNTER
BY Herbert L. Davis
ATTORNEY

INVENTOR.
SAMSON C. GELERNTER
BY Herbert L. Davis
ATTORNEY 3,454,787
MONITOR AND DELAY NETWORK COMPRISING FEEDBACK AMPLIFIER, SAMPLE AND HOLD CIRCUIT AND THRESHOLD DETECTOR COMBINATION FOR ERROR SIGNAL LEVEL DETECTOR Samson C. Gelernter, Flushing, N.Y., assignor to The Bendix Corporation, a corporation of Delaware Filed May 6, 1966, Ser. No. 548,253
Int. Cl. H03k 5/20, 5/08
U.S. Cl. 307—235 10 Claims This invention relates to a monitor and delay network and more particularly to an electronic monitoring and delay network to detect a predetermined and adjustable level of an error signal. The error signal may be a D.C. signal, a periodic or an aperiodic A.C. signal; such as, a sinusoid, a ramp or a pulse train. Error signals of several millivolts amplitude as well as those in the range of several volts can be detected. The superiority of the network of the present invention lies in its extreme flexibility and in the type of signals it can handle with complete immunity to extraneous disturbances as well as its resolution, accuracy and simplicity, as compared to networks of conventional types.

Heretofore, if an A.C. signal level in a millivolt range is to be detected and an alarm sounded or fault condition indicated, a system has been employed in which a high gain A.C. amplifier is used to boost the error signal into the range of several volts. In the latter system for good temperature operation a complex ring demodulator may be used in place of a conventional detector network to convert the high level error signal to D.C. The resulting D.C. level may serve to fire a first Schmitt trigger which in turn begins to charge an RC network at the input to a second Schmitt trigger. A gate network which may include several transistors, resistors and diodes will provide a fast removal of excitation to trigger the second Schmitt trigger when the error signal drops below a maximum allowable value.

An object of the present invention is to provide an improvement in such a conventional network arrangement in the provision of a novel monitor and delay network which includes means for effecting a summation of a reference voltage and an error voltage so as to provide a summing point which is an amplifier input terminal and in which novel arrangement the amplifier output goes into a sample and hold network which then feeds a threshold detector to control an alarm device.

Another object of the invention is to provide an improved monitor and delay network in which an input error signal is compared to a fixed D.C. reference and the algebraic sum thereof serves as the excitation to an amplifier having a non-inverting input including a positive feedback connection from the amplifier output so that as soon as the summation of the error and reference voltage changes phase, the output immediately switches from one saturation state to the other so that dynamic operation of the network will produce a pulse train with a repetition rate the same as that of the error signal $E_s$ or the frequency of an A.C. error signal $E_s$, and a pulse width proportional to the amplitude of the error signal $E_s$.

Another object of the invention is to provide in such an improved monitor and delay network a sample and hold network in which a leading edge of an effective voltage pulse at the output of the amplifier charges up a first capacitor almost instantly at a rate of $t_1$ seconds while the first capacitor discharges at a relatively slower rate of $t_2$ seconds, the rapid rate of charging the first capacitor being so arranged as to cause a control switch means to produce a fast break in a discharging circuit of a second capacitor, while the slower rate of discharge of the first capacitor being so arranged that in the event a train of said voltage pulses are continuously present at the input to the first capacitor, the discharging current for the second capacitor will be held open by the charge applied to the first capacitor so that the second capacitor may continue to be charged at a much slower rate of $t_3$ seconds to a predetermined level to effect a slow make or change in an operative condition of a threshold device, whereupon the threshold device will remain in the changed condition, so long as the train of voltage pulses may continue, but in the event the pulse train at the input to the first capacitor is discontinued, the first capacitor is thereupon discharged at the rate of $t_2$ seconds to cause the control switch means to render effective the circuit to discharge the second capacitor immediately upon the removal of the error signal effecting the pulse train at the input of the first capacitor.

Another object of the invention is to provide in the aforenoted network a Zener diode having a reverse current breakdown characteristic such that upon the input to the threshold device exceeding the critical breakdown voltage of the Zener diode a reverse flow of current is effective through the Zener diode to fire a controlling transistor of a Darlington connection in the threshold device to in turn effectively energize an alarm device, the Darlington connection being so provided as to contain the charge on the second capacitor so long as the pulse train at the output of the amplifier may continue.

Another object is to provide in a modified form of the invention a field effect transistor control means in place of the Darlington connection to somewhat more effectively contain the charge on the second capacitor and simplify the operative network.

Another object of the invention is to provide an analog monitor system, in which the aforenoted monitor and delay network may be very advantageously adapted for several related applications, in that in an analog to digital conversion, an array of such monitor and delay networks may be used, each adjusted to convert (with high precision) a separate and distinct signal level to a digital output.

Another object of the invention is to provide an improved monitor and delay network which may be utilized as a pulse-presence detector and a simple and disturbance proof network operable to determine either the presence or absence of a continuous pulse train.

Another object of the invention is to provide a demodulator operable in conjunction with the monitor of the present invention so as to render the monitor effective to detect both the phase as well as the level of an A.C. output signal.

Another object of the invention is to provide in a sampled data system the improved network of the present invention operable as a sample and hold network in conjunction with a clocked pulse input to actuate a switching means to periodically render the sample and hold network effective.

Another object of the invention is to provide the improved monitor and delay network of the present invention as a precise D.C. to pulse width modulator by providing an A.C. voltage as a reference voltage and a D.C. voltage as a signal input.

Another object of the invention is to provide in the aforenoted network a first capacitor charged through a resistor at an input to a sample and hold network, the first capacitor having a discharge circuit controlled by a transistor effectively operated by a charge applied to a second capacitor at said input, the controlling transistor being so arranged as to effect the discharge of the first capacitor through said discharge circuit upon removal of an error signal effecting the input voltage so that if a train of voltage pulses are continuously present at the input to the sample and hold network, the first capacitor will be charged at a relatively slow rate of T3 seconds so as to yield a slow make of a threshold detector and remain at the charged value so long as the discharge circuit is rendered ineffective by the controlling transistor operated by the charge applied to the second capacitor, the second capacitor being arranged to operate the controlling transistor to discharge the first capacitor immediately upon the removal of the pulse train applied at the input to the sample and hold network.

Another object of the invention is to provide a novel monitor and delay network in which low error signals may be detected with excellent accuracy while delays of several seconds may be achieved independently of the type or frequency of the error signal.

Another object of the invention is to provide a novel monitor and delay network in which excellent noise immunity is inherent in the network without the sacrifice of sensitivity.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

Figure 1:
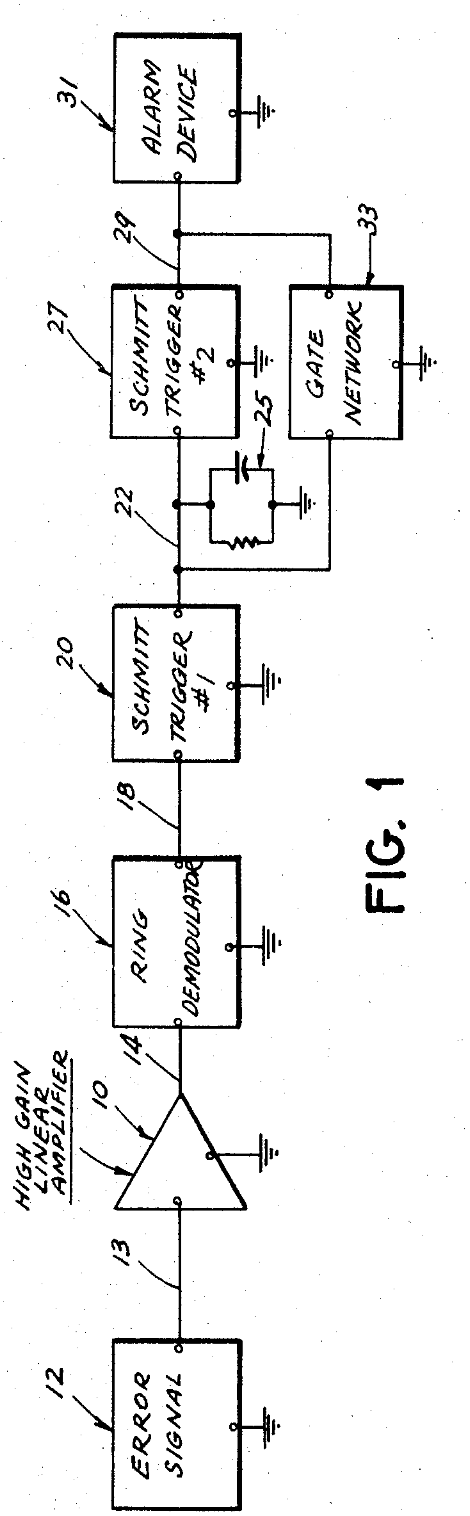
FIGURE 1 is a schematic box diagram of a conventional type monitor and delay system.

Referring now to the drawing of FIGURE 1 in which there is shown by box diagram a conventional monitor and delay network by which an A.C. signal level in a millivolt range may be detected and an alarm sounded or fault condition indicated. In such conventional arrangement a high A.C. amplifier 10 of conventional type may be used to boost an error voltage signal from a suitable source 12 into the range of several volts at the output 14 of the amplifier 10. In the latter conventional system in order to provide good temperature operation a complex ring demodulator 16 may be used in place of a detecting network to convert the higher level A.C. error signal at the output 14 from the amplifier 10 to a direct current to be applied at output 18 from the ring demodulator 16.

The resulting direct current applied at the output 18 upon reaching a predetermined critical level may serve to fire or trigger a first Schmitt trigger device 20 which then in turn applies at an output conductor 22 a charging current to an RC network 25 connected across the input to a second Schmitt trigger device 27 to render the same effective to apply a controlling current through an output conducor 29 to an alarm device 31. The forenoted monitor and delay network of FIGURE 1 may include in addition a gate network 33 connected across the conductors 22 and 29 and including several resistors and diodes arranged in a conventional network to provide a fast removal of the excitation current to the second Schmitt trigger device 27 when the error signal applied through the high gain amplifier 10 drops below a maximum allowable value.

Figure 2:
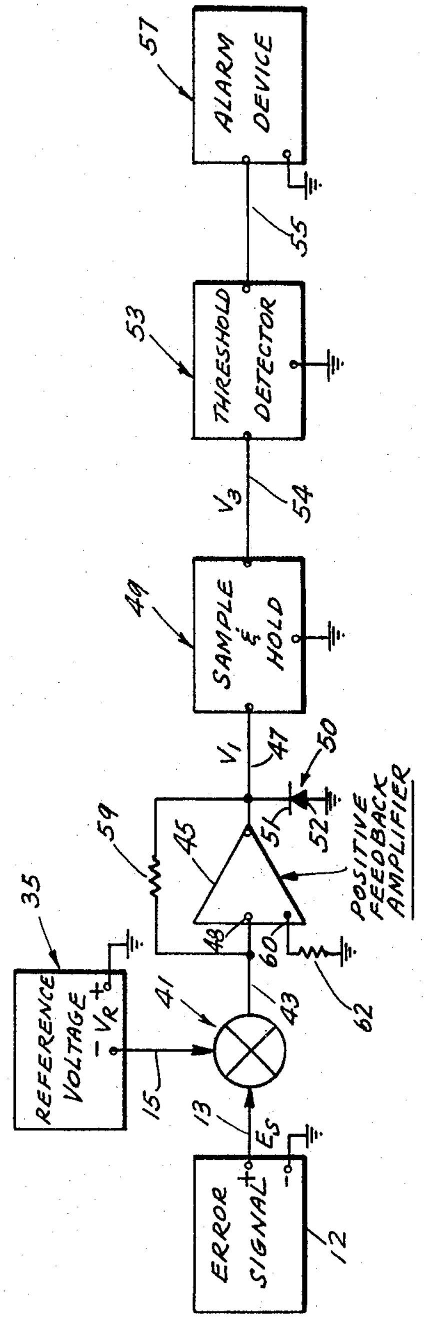
FIGURE 2 is a schematic box diagram of a monitor and delay network embodying the present invention.
Figure 3:
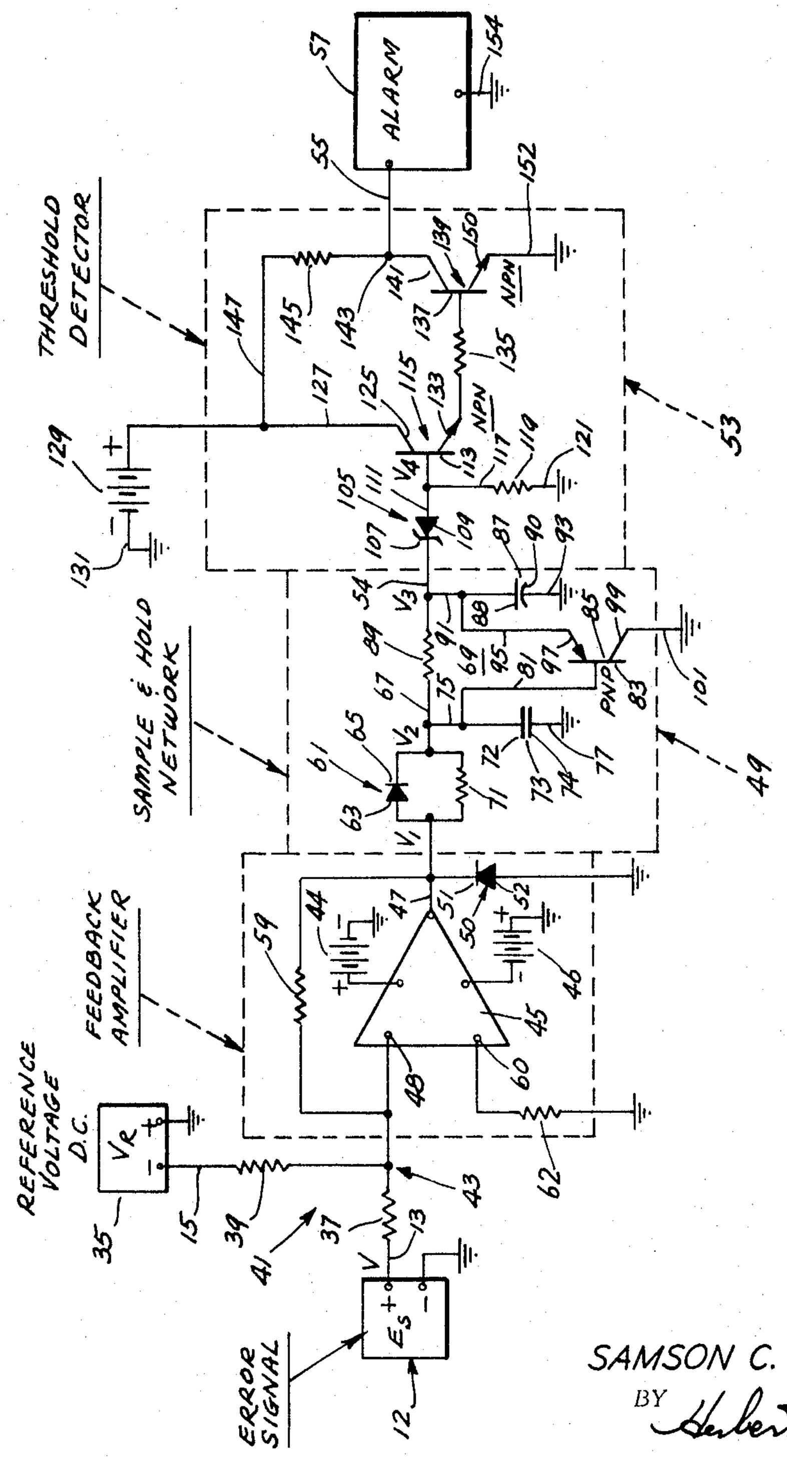
FIGURE 3 is a wiring diagram illustrating operative components of the several boxes of the schematic network shown in FIGURE 2.

The network of the present invention, as shown by the block diagram of FIGURE 2 and in detail by the wiring diagram of FIGURE 3, provides an improvement in the conventional arrangement of FIGURE 1, in the provision of a novel monitor and delay network which includes means for effecting a summation of the error voltage signal $E_S$ applied by a suitable electrical signal device 12 with a reference voltage $V_R$ applied by a suitable source of direct current or battery 35. The signal device 12 having an output terminal connected to a conductor 13 and an opposite output terminal connected to ground while the reference voltage source 35 has a negative terminal connected to a conductor 15 and a positive terminal connected to a common ground.

The respective conductors 13 and 15 are in turn connected to a pair of summing resistors 37 and 39 of a summing device 41 so arranged as to provide at a summing point or conductor 43 a voltage which is the algebraic sum of the error signal voltage $E_S$ and the reference voltage $V_R$ applied by the devices 12 and 35. The resultant summation voltage is then applied through the conductor 43 to an input terminal 48 of an operational amplifier 45 which may be of a conventional type.

As is well known in the art, the operational amplifier 45 includes a source of operating voltage or battery 44 having a positive terminal connected to the operating circuitry of the amplifier 45 and a negative terminal connected to ground and an additional operating voltage source or battery 46 having a negative terminal connected to theoperating circuitry of the amplifier 45 and a positive terminal connected to ground. The amplifier 45 has an output conductor 47 connected to an input of a sample and hold network 49 to control the operation of an output 54 thereof leading to a threshold device 53 which in turn controls through an output conductor 55 an alarm or fault indicator device 57 which may be of a conventional type.

Figure 8:
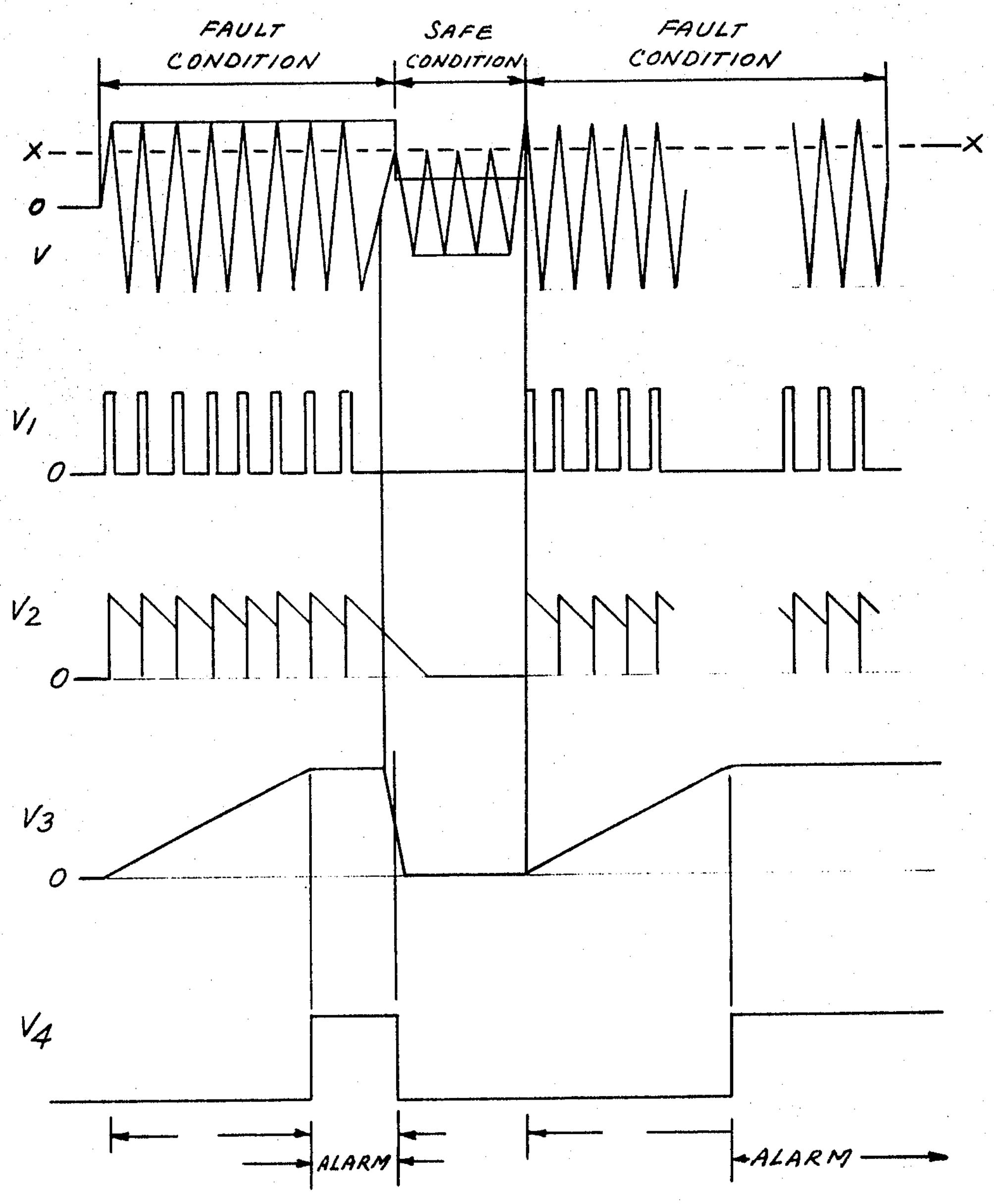
FIGURE 8 is a graphical illustration showing the waveforms of the electrical signals effective at the indicated points on the monitor and delay networks of FIGURES 3, 5, 6 and 7.

In the improved monitor and delay network of FIGURES 2 and 3, the error signal $E_S$ supplied from the device 12 to the conductor 13 may be a pulsating D.C. signal of positive potential or an A.C. signal having a sinusoidal wave form alternating between positive and negative phases thereof as shown graphically at V of FIGURE 8. The error signal $E_S$ is applied through the summing resistor 37 to the summing point 43 and there compared to a fixed D.C. reference voltage $V_R$ applied by a suitable source 35 having a negative terminal connected through a second summing resistor 39 to the summing point 43 and a positive terminal connected to ground. Alternately, the reference voltage $V_R$ may be positive to detect a negative going signal. The whole logic must then be reversed.

The algebraic sum thus provided by the summing device 41 and effective at the summing point 43 is applied at an input terminal 48 of the operational amplifier 45. A positive feedback connection including a resistor 59 leads from the output conductor 47 of the operational amplifier 45 to the conductor 43 leading to the input terminal 48 of the amplifier 45.

The output conductor 47 has connected thereto a diode device 50 having unidirectional current flow characteristics. Thus there is connected to the output conductor 47 a cathode element 51 of a diode 50 having an anode element 52 connected to ground so that there is effected through the feedback resistor 59 a non-inverting input at the input terminal 48 of the amplifier 45 only of positive polarity. In addition to the input terminal 48, the operational amplifier 45 has an opposite input terminal 60 connected through a resistor 62 to a common ground. The grounded positive terminal of the reference source 35 is connected through the diode 50 to the output conductor 47 so as to clamp the output voltage at conductor 47 to a predetermined minimum negative level set by the voltage drop across the diode 50.

Thus upon the resultant summation of the error voltage signal $E_S$ and reference voltage $V_R$ applied at the summing point 43 changing from a positive to a negative phase, the output at the conductor 47 immediately switches from a saturation state to an unsaturated state. It will be seen then that dynamic operation of the amplifier 45 will produce at conductor 47 a train of positive pulses with a repetition rate the same as that of the frequency of the pulsating D.C. or A.C. error signal $E_S$ and a pulse width proportional to the amplitude of the error signal $E_S$ applied by the device 12.

The improved monitor and delayed network, as shown by FIGURE 3, includes a sample and hold network 49 in which there is serially connected to the output conductor 47, a diode device 61 having unidirectional current flow characteristics. Thus, the diode 61 has an anode 63 connected to the conductor 47 and a cathode 65 connected to a conductor 67 leading to the input of a novel resistance-capacitance network 69, as hereinafter explained. Connected in parallel relation to the diode 61 is a resistor 71 leading from the conductor 47 to the conductor 67. The arrangement of the diode 61 and resistor 71 is such that the train of positive pulses applied at the conductor 47 pass freely through the diode 61 to the conductor 67 while the diode 61 prevents a reverse flow of current therethrough from the conductor 67 to conductor 47. The resistor 71 provides a time delay in the reverse flow or current discharge from the resistance-capacitance network 69 therethrough from conductor 67 to conductor 47 and through the operational amplifier 45 to ground.

The novel resistance-capacitance network 69 of the sample and hold network 49 includes three separate and adjustable time constants. Thus, the leading edge of positive pulses applied through the diode 61 to the conductor 67 serve to charge up a capacitor 73 almost instantly at a rate of T1 seconds. The capacitor 73 has a plate 72 connected by conductor 75 to the conductor 67 so as to be positively charged by the positive pulses applied through the diode 61 while an opposite plate 74 of the capacitor 73 is connected by a conductor 77 to ground and negatively charged.

The conductor 75 leading from the positively charged plate 72 of the capacitor 73 is connected by a second conductor 81 to a base element 83 of a PNP type transistor 85. The transistor 85 is arranged to control the charging and discharging of a second capacitor 87 having opposite plates 88 and 90.

In the novel arrangement of the resistance-capacitance network 69 of the sample and hold network 49, the pulse train input conductor 67 is connected through a resistor 89 to the output conductor 54 which is in turn connected through a conductor 91 to the plate 88 of the second capacitor 87 which has the opposite plate 90 connected by conductor 93 to ground. A conductor 95 leads from the conductor 91 to an emitter element 97 of the control transistor 85 which in turn has a collector element 99 connected to ground by a conductor 101.

The arrangement of the resistance-capacitance network 69 is such that the positive charge applied through the conductor 75 to the plate 72 of the capacitor 73 acts through the conductor 81 to positively bias the base 83 of the transistor 85 so as to normally maintain the transistor 85 nonconductive between the emitter element 97 and the collector element 99. Moreover, the discharge of the capacitor 73 through the resistor 71 is at a relatively slow rate of T2 seconds so that so long as the charging pulse train is continuously present at the input conductor 67, the positive bias applied at the base 83 is sufficient to maintain the transistor 85 nonconductive.

Thus, the resistor 71 controls the discharge of the capacitor 73 and is so arranged as to prevent a rapid discharge thereof while the diode 61 controls the charging of the capacitor 73 so as to permit the positive pulses applied at the output conductor 47 to rapidly effect the charging thereof while preventing a reverse discharge of the capacitor 73 through the diode 61.

The pulse train thus applied through the diode 61 to the input conductor 67 will effect a relatively rapid charge of the first capacitor 73 while the second capacitor 87 will be charged at a much slower rate of T3 seconds through the resistor 89. The positive charge thus applied to the plate 88 of the capacitor 87 through resistor 89 will build up to a predetermined value at which the threshold device 53 will be rendered effective by the positive bias applied by the charged capacitor 87 through conductor 54. The positive charge applied to the plate 88 of the capacitor 87 will remain at the level rendering the threshold device 53 effective until a discharge of the second capacitor 87 is effected by the controlling action of PNP type transistor 85, as hereinafter explained.

The transistor 85 is rendered conductive to discharge the second capacitor 87 immediately upon the removal of the error signal effecting the pulse train at the conductor 67, in that the first capacitor 73, upon cessation of the pulse train at the conductor 67, is thereupon discharged by a reverse flow of current from plate 72 through the resistor 71, conductor 47, amplifier 45 and to ground. The transistor 85 is thereafter so biased at the base 83 by the dissipation of the charge applied to the first capacitor 73, that the transistor 85 is thereupon rendered conductive between the emitter element 97 and the collector element 99 to discharge therethrough the second capacitor 87 to ground.

As shown in the drawing of FIGURE 3, the threshold device 53 includes a Zener diode 105 having a cathode element 107 connected to the conductor 54 and an anode element 109 connected through a conductor 111 to a base element 113 of an NPN type transistor of a Darlington connection which may be of conventional type. Also connected to the conductor 111 by a conductor 117 is a resistor 119 leading through a conductor 121 to ground.

The Zener diode 105 is of a type having a reverse current breakdown characteristic which permits conduction in the back direction when voltages exceeding certain values are applied. Moreover such Zener diode in the reverse or back direction has a substantially constant threshold potential below which it is nonconductive and above which it is conductive and a substantially constant impedance when conductive.

In the Darlington connection the transistor 115 has a collector element 125 connected by a conductor 127 to a positive terminal of a source of direct current or battery 129 having a negative terminal connected by a conductor 131 to ground. The NPN type transistor 115 also has an emitter element 133 connected through a resistor 135 to a base element 137 of an NPN type transistor 139 in a conventional Darlington connection. The NPN type transistor 139 includes a collector element 141 connected through a conductor 143, a resistor 145, and a conductor 147 to the conductor 127 leading to the positive terminal of the battery 129. The transistor 139 also has an emitter element 150 connected to the ground through a conductor 152. The output conductor 55 leads from the collector 141 of the NPN type transistor 139 to a suitable alarm or fault indicator 57 which may be of a conventional type. An opposite input conductor 154 leads from the alarm or indicator device 57 to ground.

In the aforenoted arrangement of the threshold detector 53, the Zener diode 105 has a predetermined reverse current breakdown characteristic, such that upon the positive charge applied to the plate 88 of the capacitor 87 through the conductor 91 building up to a predetermined value there will be effected a reverse flow of current through the diode 105 from conductor 54 to 111 and through resistor 119 to ground which will apply a positive bias to the base 113 of the NPN type transistor 115 to render the same conductive of electrical energy from the collector 125 to the emitter 133 which action will in turn apply a positive bias to the base 137 of the second NPN type transistor 139 of the Darlington connection. This in turn will render the second NPN type transistor 139 conductive of electrical energy from the collector 141 to the grounded emitter 150 to decrease the positive bias applied at output conductor 55 to effect an output signal through the conductor 55 to cause the device 57 to render an alarm or indication of a fault condition.

The Darlington connection of the transistors 115 and 139 are so provided as to contain the charge on the second capacitor 87 so long as a pulse train at the conductor 67 effected by the error signal may continue. However, upon the removal of the error signal effecting the pulse train at the conductor 67, the second capacitor 87 is immediately discharged through the transistor 85, as heretofore explained, whereupon the positive bias supplied through the Zener diode 105 to the base 113 of the transistor 115 is removed so that the transistors 115 and 139 of the Darlington connection are rendered nonconductive. This in turn causes an increase in the positive bias applied at output conductor 55 thereupon applying an output signal through the conductor 55 to terminate the operation of the alarm or fault indicator device 57 in a conventionl manner.

Analog to digital conversion

Figure 4:
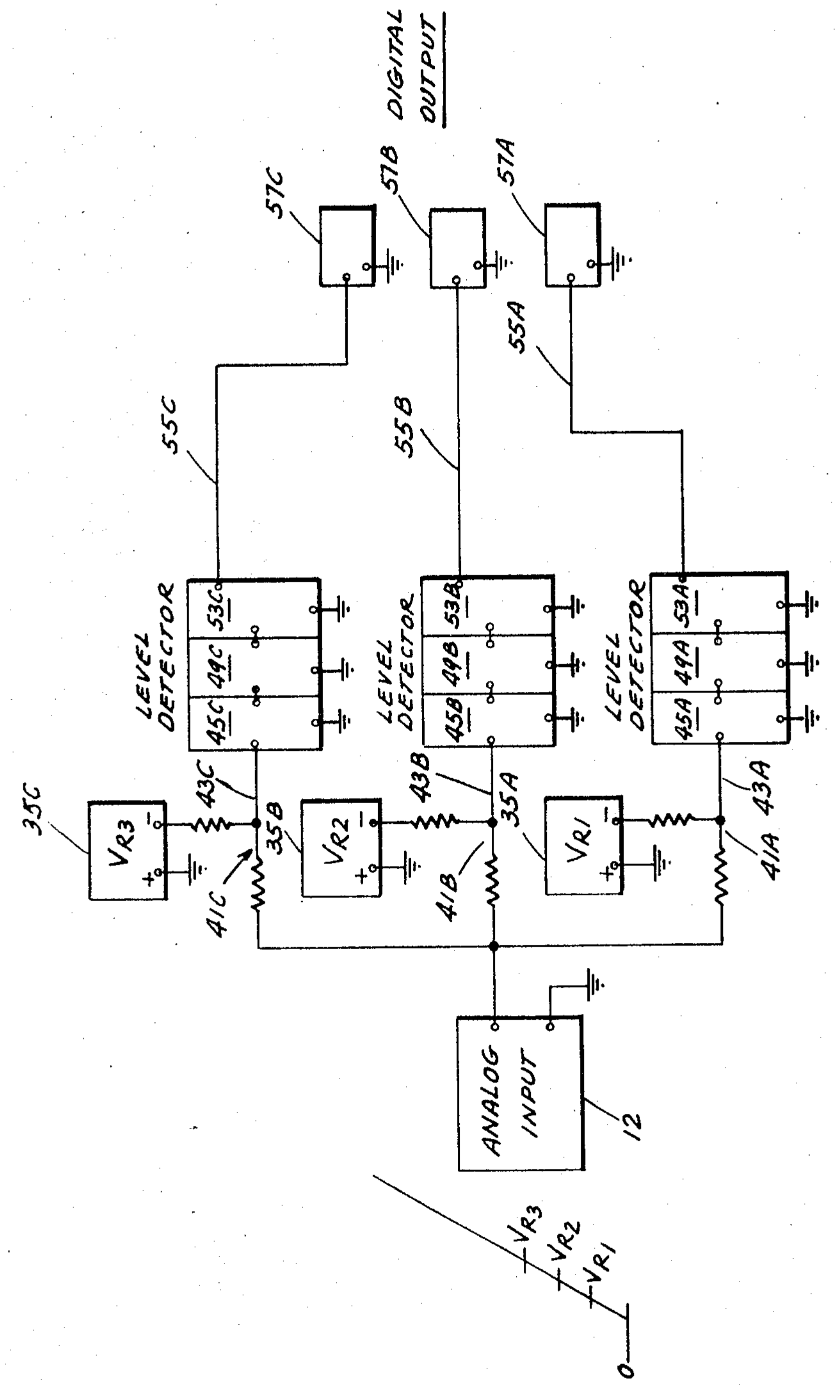
FIGURE 4 is a schematic box diagram illustrating an array of the networks of FIGURE 3, each adjusted to convert (with high precision) a separate and distinct D.C. or A.C. level to a digital output so as to effect an analog to digital conversion.

Referring to the drawing of FIGURE 4, there is shown an analog to digital converter system in which the network of FIGURE 3 may be very advantageously applied in each of the respective level detector boxes, diagrammatically indicated in FIGURE 4. Thus in analog to digital conversion, an array of such networks may be used.

In the arrangement of FIGURE 4, like parts to those heretofore described with reference to FIGURE 3, have been indicated by corresponding numerals to which have been applied the suffix A, B and C, respectively, to indicate the separate networks of the array. In the array of FIGURE 4 each of the networks have been adjusted to convert (with high precision) a separate and distinct D.C. or A.C. signal level to a digital output as shown schematically in FIGURE 4.

Thus, in the array of FIGURE 4 the reference voltage source 35A may be set at a relatively low voltage value designated $V_{R1}$ while the reference voltage source 35B may be set at another and a higher voltage level designated $V_{R2}$ and the third reference voltage source 35C may be set at a still higher voltage level designated $V_{R3}$.

It will be seen then that the alarm or fault indicator devices 57A, 57B, and 57C will be brought into operation at different analog input voltages applied by the signal device 12 to convert such analog input signals to digital values designated by the indicators 57A, 57B, and 57C, respectively, which in this case serve as digital indicators.

While the array of FIGURE 4 shows for purposes of illustration only three of such monitor and delay networks of the type illustrated in FIGURE 3, it will be clear from the foregoing that a greater or lesser number of network arrays may be provided as may be desired to effect the analog to digital conversion sought in each particular case.

Sample data system

In the form of the invention illustrated in FIGURE 5 corresponding parts to those heretofore described with reference to FIGURES 2 and 3, have been indicated by like numerals. In addition, there is provided a novel clock pulse input means 300 to operate a switching means 302 to periodically render the sample and hold network effective as a sample data system.

Figure 5:
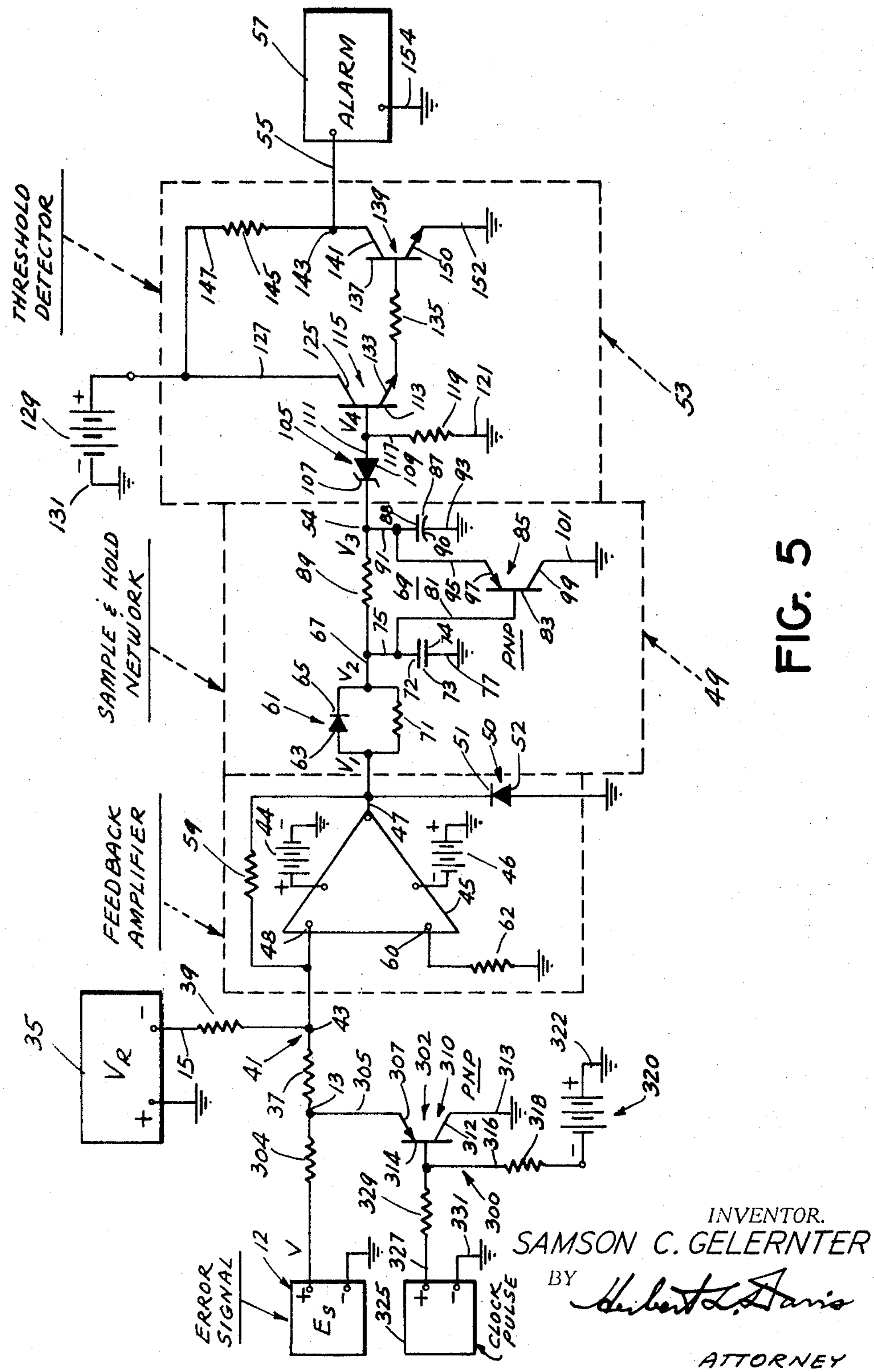
FIGURE 5 is a modified form of the invention of FIGURE 3 and illustrates by way of a wiring diagram, a demodulator used in conjunction with the monitor and delay network to detect both the phase as well as the level of a signal and which system may be utilized as a sample and hold network in conjunction with a clocked pulse input to actuate a control switch in a sampled data system.

In the monitor and delayed network of the form of the invention of FIGURE 5, the output of the error signal device 12 is connected through a resistor 304 to the conductor 13, which in turn is connected through the resistor 37 to the input conductor 43 of the operational amplifier 45. Also leading from conductor 13 is a conductor 305 which leads to an emitter element 307 of a PNP type transistor 310, having a collector element 312 connected through a conductor 313 to ground.

The PNP type transistor 310 forms the switching means 302 operated by the clocked pulse input means 300 and includes a base element 314 connected by conductor 316 and resistor 318 to a negative terminal of a source of electrical energy or battery 320, having a positive terminal connected to ground through conductor 322 so that normally the base 314 of the PNP type transistor 310 is negatively biased so as to render the transistor 300 conductive between the emitter element 307 and the collector element 312, so as to normally in effect short the error signal applied by the device 12 to ground and thereby render the monitor and delay network ineffective so long as the transistor 310 is in the conductive state.

There is further provided a periodic source of positive voltage pulses for rendering the transistor 310 periodically nonconductive. In order to effect the latter operation, there is provided a conventional clocked pulse source 325, having an output conductor 327 leading from the positive terminal of the clocked pulse source 325 and a negative terminal connected to ground through a conductor 331.

The output conductor 327 is connected through a resistor 329 to the base element 314 of the transistor 310 to apply thereto positive electrical pulses, which in effect render the PNP type transistor 310 nonconductive for the duration of each positive pulse.

The positive clock pulses thus applied to the base 314 of the PNP type transistor 310 in rendering the same nonconductive for the duration of the pulses thereof simultaneously render the monitor and delay network effective for the duration of the pulse to sample the error signal applied by the device 12. Thus, the network of FIGURE 5 may be readily utilized in sample data systems as a sample and hold network in conjunction with the clock pulse input provided to actuate the control switching means 302.

Another application of the network of FIGURE 5, is that of a precise direct current to pulse width modulator which may be accomplished by providing the reference source 35 as a source of AC voltage and the device 12 as a variable amplitude direct current signal source having a positive terminal connected through the resistor 304 to the conductor 13 and a negative terminal connected to ground.

Field effect transistor threshold detector

In the form of the invention illustrated in FIGURE 6 corresponding parts have been indicated by like numeral to those parts described with reference to FIGURE 3. Furthermore, in the network of FIGURE 6 there has been substituted in the Threshold Detector 53 a Field Effect Transistor 400 in place of the transistor 115 of the Darlington connection shown in FIGURE 3.

The Field Effect Transistor 400 includes a drain element 402 connected by a conductor 404 resistor 406 and conductor 408 to the positive terminal of the source of electrical energy or battery 129 having a negative terminal connected to ground by the conductor 131. The Field Effect Transistor 400 further has a source element 410 connected to a cathode element 412 of a Zener diode 414 having an anode element 416 connected by conductor 418 to ground. The Field Effect Transistor 400 further has a gate element 420 which is connected directly to the output conductor 54 leading from the resistance-capacitance network 69 and through a resistor 421 to ground.

Further connected between the conductor 408 and the conductor 411 is a resistor 422, providing a limited path for the flow of electrical energy from the positive terminal of the battery 129 to the cathode element 412 of the Zener diode 414.

The cathode element 412 of the Zener diode 414 is positively biased from the voltage source 129 through the resistor 422 so as to provide a reference source voltage determined to keep the field effect transistor in the cutoff state so long as the positive charge applied to the plate 88 of the capacitor 87 remains below a predetermined critical voltage level. Thus, the field effect transistor 400 may continue in a nonconductive state between the drain element 402 and the source element 410.

However upon the positive charge applied to the plate 88 of the capacitor 87 being increased to a value above the predetermined critical voltage level, the positive bias applied to the gate terminal 420 of the Field Effect Transistor 400 is then increased to a value sufficient to increase the conductivity of the transistor 400.

The Zener diode 414 is of a type having a critical predetermined reverse current breakdown characteristic, as heretofore described, which upon the conductivity of the transistor 400 being sufficiently increased is effective to permit a reverse flow of current therethrough whereupon the firing of the field effect transistor is initiated.

The initiation of the flow of current through the Field Detector Transistor 400 from the drain eleemnt 402 to the source element 410 then effects a decrease in the positive bias applied through an output conductor 425 leading from the drain terminal 402 through resistor 427 and a conductor 429 to a base element 431 of an NPN type transistor 435.

There further leads from the conductor 429 a resistor 435 connected through a conductor 437 to a negative terminal of a source of direct current or battery 439 having a positive terminal connected through a conductor 441 to ground. Thus, so long as the firing of the Field Effect Transistor 400 continues, the resulting decreases in the positive bias applied to the base 431 of the NPN type transistor 435 in effect renders the NPN type transistor 435 nonconductive between a collector element 443 and an emitter element 445 thereof. The emitter element 445 is connected by a conductor 446 to ground, while the collector element 443 is connected through a conductor 448 to a relay winding 450 and through a conductor 452 to a positive terminal of a source of voltage or battery 455 having a negative terminal connected to ground.

The relay winding 450 is arranged to control a relay switch 457 which upon energization of the winding 450 is effective to open a control circuit for an alarm device 458 while upon de-energization of the relay winding 450 the control circuit is closed for rendering effective a suitable alarm or fault indicator device 458 which may be of a conventional type.

The arrangement is such, that upon the firing of the Field Effect Transistor 400 being initiated and the transistor 435 as a result thereof being rendered nonconductive, the relay winding 450 is thereupon de-energized through the transistor 435. The de-energization of the relay winding 450 therefore causes the relay switch 457 to close a circuit leading from a battery 460 to the alarm or fault indicator device 458 to render the same effective to indicate a faulty operating condition.

Reference voltage source

Figure 6:
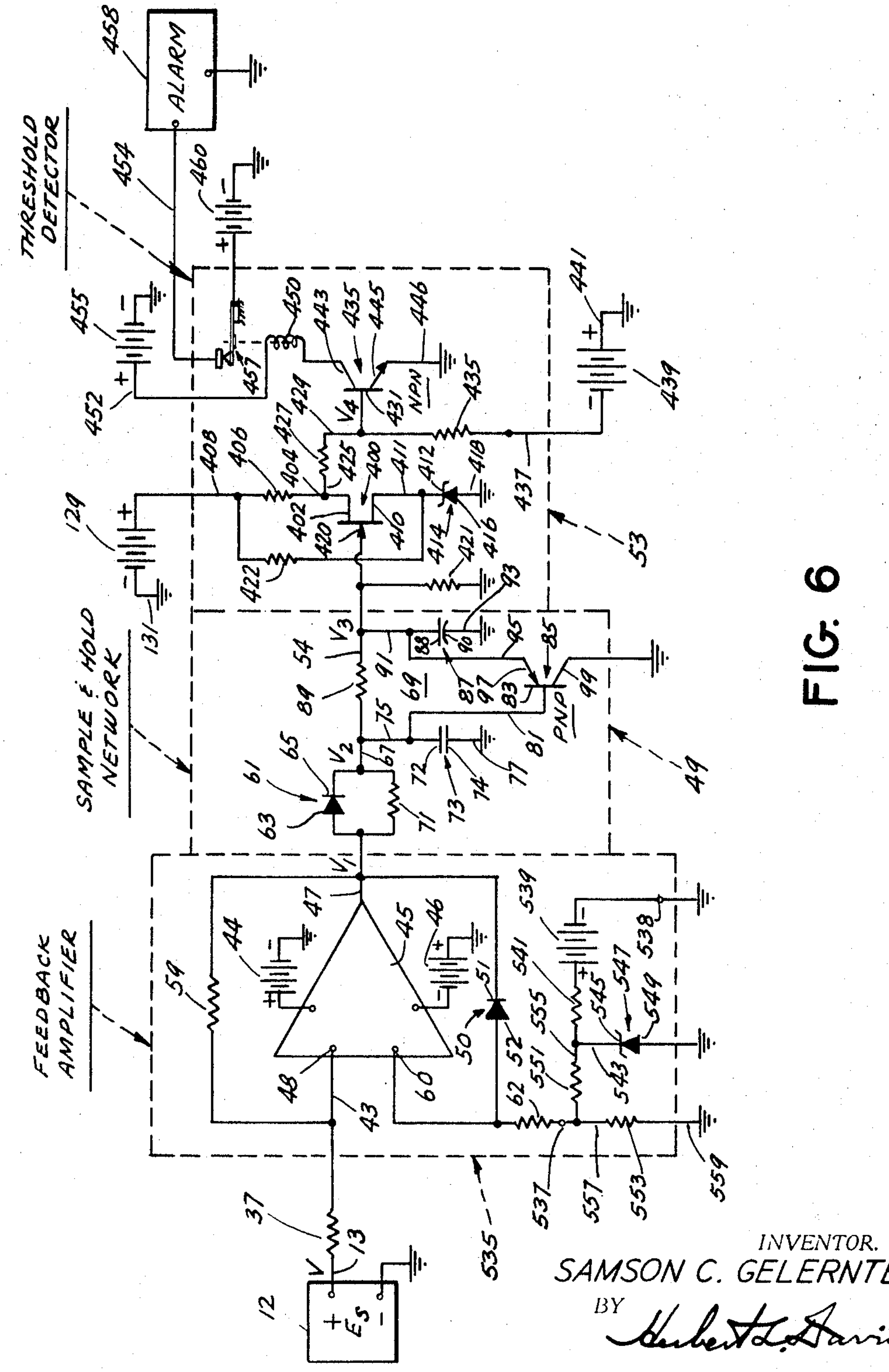
FIGURE 6 is a modified form of the monitor and delay network of FIGURE 3 in which a field effect transistor has been substituted in place of the Darlington connection of FIGURE 3.
Figure 7:
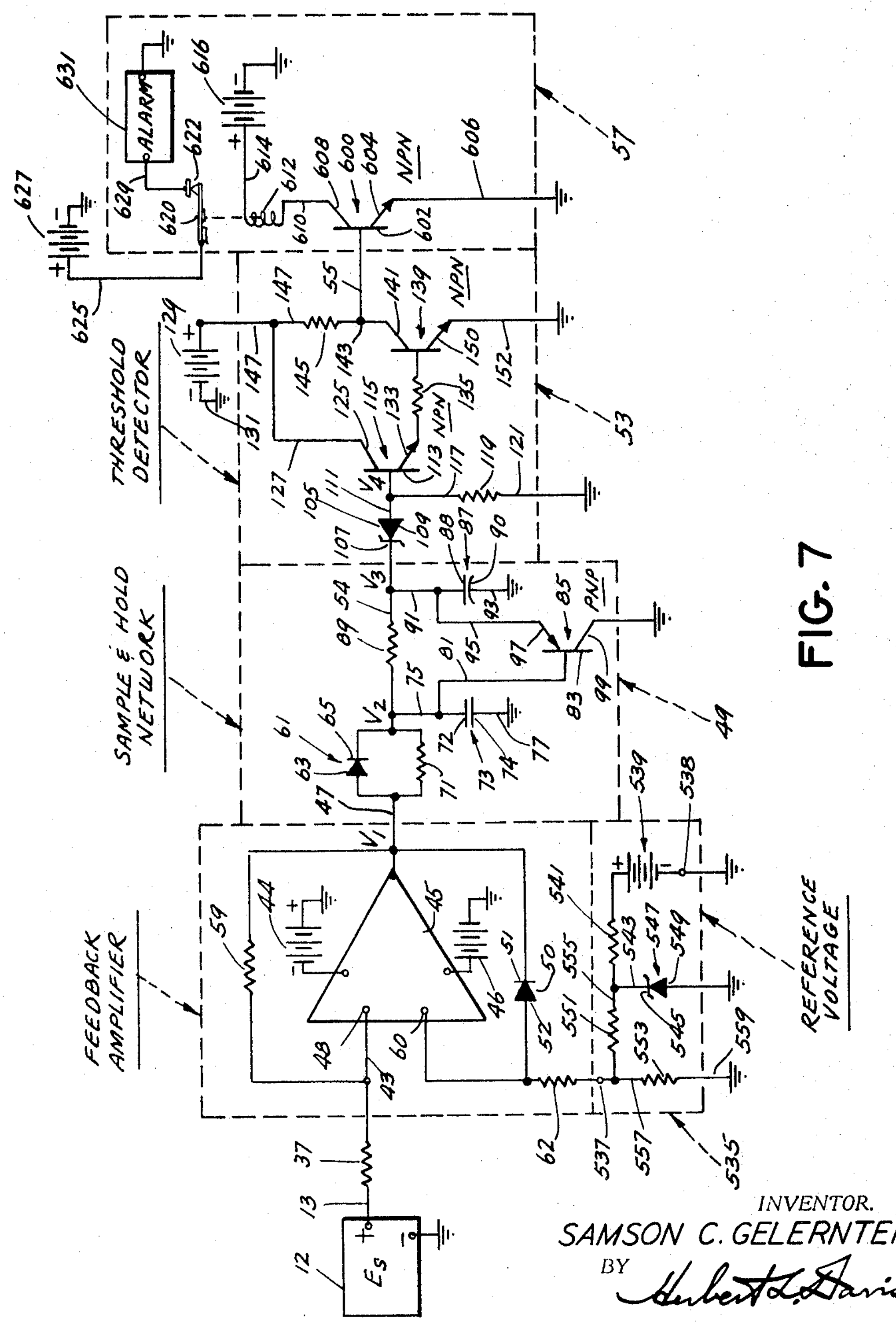
FIGURE 7 is a wiring diagram of another modified form of the monitor and delay network as applied to a level detector and relay mechanism to operate an alarm.

In the Monitor and Delay Network of FIGURES 6 and 7 corresponding parts to those heretofore described in FIGURE 3 have been indicated by like numerals.

The reference voltage source 535 in the form of the invention of FIGURES 6 and 7 differs from the reference voltage source 35 in that a positive terminal 537 of the D.C. source 535 is connected through resistor 62 to the input terminal 60 of the operational amplifier 45 rather than to the input terminal 48, while a negative terminal 538 is connected to ground rather than through the resistor 39 to the input terminal 48 as in the case of the reference voltage some 35 in FIGURE 3.

Further, the reference voltage source 535 includes a direct current voltage source or battery 539 having a negative terminal connected to ground through the terminal 538 and a positive terminal connected through a resistor 541 and a conductor 543 to a Zener diode 547 of a type having a predetermined reverse current breakdown characteristic, as heretofore described. The conductor 543 is connected to a cathode element 545 of the Zener diode 547 while an anode element 549 of the Zener diode 547 is connected to ground.

Connected across the Zener diode 547 and between the conductor 543 and the ground connection are a pair of voltage dividing resistors 551 and 553 with the resistor 551 being connected by a conductor 555 to the conductor 543 and through a conductor 557 to the positive output terminal 537 and the resistor 553 which is in turn connected through a conductor 559 to ground.

The predetermined reverse current breakdown characteristic of the Zener diode 547 is somewhat lower than the voltage output of the battery 539 and so arranged as to regulate the voltage at the output terminal 537 as divided down by the voltage divider resistors 551 and 553 to an accurate predetermined reference voltage level.

Fault indication

Further in the monitor and delay network of FIGURE 7, the alarm device 57 may include an additional NPN type transistor 600 having a base element 602 connected to the output conductor 55 leading from the threshold detector 53. The transistor 600 further includes an emitter element 604 connected by conductor 606 to ground and a collector element 608 connected by a conductor 610 to one end of a relay winding 612 having an opposite end connected by a conductor 614 to a positive terminal of a source of direct current on battery 616 which in turn has a negative terminal connected to ground.

The relay winding 612 is arranged in cooperative relation with a relay switch arm 620 biased under spring tension into contacting relation with a relay contact 622 upon de-energization of the relay winding 612. The relay switch arm 620 is connected by a conductor 625 to a positive terminal of a battery 627 having a negative terminal connected to ground. The relay contact 622 is in turn connected by a conductor 629 to a terminal of a suitable alarm or fault indicator mechanism 631 of conventional type having an opposite terminal connected to ground.

The arrangement of the device 57 is such that under normal operating conditions a positive bias is applied through the output line 55 from the threshold detector 53 to the base 602 of the transistor 600 to render the same conductive between the collector element 608 and the emitter element 604 whereupon the relay winding 612 is energized to bias the relay switch arm 620 out of contacting relay with the switch contact 622 so that no alarm or fault indicator is effected by the mechanism 631.

However, upon a fault condition being sensed, the positive bias applied through output conductor 55 to the base 602 of the transistor 600 is decreased rendering the transistor nonconductive whereupon the relay winding 612 is de-energized and the relay switch arm 620 is actuated under the spring tension thereof into closing relation with the switch contact 622 to actuate the alarm or fault indicator mechanism 631 to effect a fault alarm or indication. This action will also be effected upon failure of any of power sources 616, 129, 539, 535 or 44 to provide a high reliabiilty feature.

Operation

The operation of the monitor and delay network of FIGURES 3, 6 and 7 may be more clearly understood by reference to FIGURE 8 in which the wave forms of the signals effected at the indicated points in the respective systems have been shown graphically.

Thus the output signal designated as V at the output line 13 from the electrical signal device 12 has been shown graphically by FIGURE 8 as an alternating current signal having a sinusoidal wave form of a magnitude which may vary between an alarm or fault condition and a normal or safe condition as indicated thereon.

It will be seen from a comparison of the waves V and $V_1$ of FIGURE 8 that upon the signal V applied at conductor 13 being in a fault condition as indicated by positive components thereof having a magnitude in excess of the value indicated by the level X—X set by the reference voltage source 35 of FIGURE 3 and 535 of FIGURES 6 and 7, there will be effected by the amplifier 45 at the output conductor 47 positive voltage pulses $V_1$, shown graphically in FIGURE 8, and having a repetition rate corresponding to the frequency of the alternating current signal V and a pulse width proportional to the amplitude of the signal $E_S$.

Under such fault condition the positive pulses $V_1$ applied at the output conductor 47 will then be applied through the diode 61 to effect at the conductor 67 positive saw tooth topped waves $V_2$, shown graphically in FIGURE 8, and acting to rapidly charge the capacitor 73 so as to apply a positive bias to the base 83 of the PNP type transistor 85 to hold the transistor 85 in a nonconductive state between the collector element 97 and the emitter element 99.

The positive wave $V_2$, which is in effect a D.C. voltage, will simultaneously provide through the resistor 89 a time delayed charging action on the second capacitor 87 so as to build up on the plate 88 of the capacitor 87 a positive charge $V_3$ which is in turn applied to the output conductor 54, as shown graphically by FIGURE 8.

The positive charge $V_3$ after a delay determined by resistor 89 and capacitor 87, upon reaching the triggering level of the threshold detector 53 renders the same effective to actuate the alarm or fault indicator device 57, as heretofore explained, by a control pulse $V_4$ shown graphically at FIGURE 8. Upon termination of the fault condition, the positive components of the sinusoidal alternating current signal V or other error signal will have a magnitude not greater than the level X—X of FIGURE 8, as set by the reference voltage source 35 of FIGURE 3 and 535 of FIGURES 6 and 7. Thereupon, since the resultant summation voltage at input conductor 43 will be at a value determined by the negative input applied by the reference voltage, the output voltage at conductor 47 will be effectively clamped by the action of the diode 50 to the predetermined minimum negative level set by the voltage drop across the diode 50 so that there will be no charging pulses $V_1$ at output conductor 47 under normal operating conditions.

Under such normal operating conditions, the positively charged plate 72 of the capacitor 73 will first discharge through the resistor 71 and the amplifier 45 to ground. The drop in the positive wave $V_2$ and the discharge of the capacitor 73 will decrease the positive bias applied thereby to the base 83 of the PNP type transistor 85 to render the transistor 85 conductive between the emitter 97 and collector 99 to render effective the discharging circuit from plate 88 of the capacitor 87 to ground, whereupon the positive charge $V_3$ applied to the plate 88 of the capacitor 87 is rapidly discharged at the initiation of the safe operating condition, as indicated graphically by FIGURE 8, whereupon the alarm control pulse $V_4$ is effectively terminated, as is also indicated graphically at FIGURE 8.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a monitor and delay network of a type including means for amplifying an error signal voltage, said amplifying means having an input and an output; the improvement comprising said amplifying means including a positive feedback circuit connecting in one sense the output to the input of said amplifying means, a source of a reference voltage, voltage clamping means connecting in another sense the output of said amplifying means to said reference voltage so as to prevent the voltage at the output of said amplifying means from decreasing below a predetermined minimum value, means for effecting an algebraic sum of the reference voltage and the error signal voltage at the input to said amplifying means so as to provide at the output of the amplifying means a train of voltage pulses upon the error signal voltage exceeding the reference voltage in a predetermined sense, the pulses of said train having a repetition rate corresponding to that of the error signal and a pulse width proportional to the magnitude that the error signal voltage exceeds the reference voltage in said predetermined sense, a threshold detector, a sample and hold network operatively connected between the output of the amplifying means and the threshold detector, means to monitor a condition of the error signal voltage, and said monitor means being controlled by the threshold detector in response to the pulse train as operatively sensed through the sample and hold network after a predetermined delay period.

2. The improvement defined by claim 1 in which the input to the amplifying means includes a pair of input terminals, and the output from said amplifying means includes a pair of output terminals, the positive feedback circuit including a resistor operatively connecting one of said output terminals to one of said input terminals, and said voltage clamping means including a unidirectional current flow conductive means operatively connected between said one output terminal and said source of reference voltage so that upon the error signal voltage being of one phase and exceeding the reference voltage in the predetermined sense the resultant output voltage applied through said feedback resistor may be effective to saturate the amplifier output so as to provide the train of voltage pulses at the output, while upon the error signal voltage being of an opposite phase the unidirectional conductive means may be effective to so apply the reference voltage therethrough in a sense to clamp the voltage at the output to a predetermined minimum voltage.

3. The improvement defined by claim 1 in which the sample and hold network includes a first capacitor, means to operatively connect the first capacitor to the output of the amplifying means so as to effect a charging of the first capacitor at a relatively rapid rate by a leading edge of a voltage pulse of the chain of pulses at said output, a second capacitor, a switch means controlled by the charge applied to the first capacitor to maintain ineffective a discharging circuit for the second capacitor, a resistor operatively connected between the output of the amplifying means and the second capacitor to render the chain of pulses at the output effective to charge the second capacitor at a relatively slower rate to a predetermined level at which the threshold detector becomes effective, and other means effective upon a discontinuance of the charging chain of voltage pulses to discharge said first capacitor so as to cause the switch means to thereafter render effective the discharging circuit for the second capacitor upon a discontinuance of the chain of voltage pulses.

4. The improvement defined by claim 3 in which the means to operatively connect the first capacitor to the output of the amplifying means includes a diode and a resistor connected in parallel between the output of the amplifying means and the sample and hold network, the diode being arranged to effect a rapid charging of the first capacitor upon the chain of output pulses being applied therethrough and the resistor being arranged to delay a discharge of the first capacitor by a reverse flow of current therethrough between pulses of said chain so that the switch means in response to the charge applied to said first capacitor may continue to maintain the discharging circuit for said second capacitor ineffective so long as the chain of pulses at the output of the amplifying means may continue.

5. A sample and hold network comprising a first capacitor, means to operatively connect the first capacitor to an output chain of voltage pulses so as to effect a charging of the first capacitor at a relatively rapid rate by a leading edge of a voltage pulse of the chain of pulses of said output, a second capacitor, a switch means controlled by the charge applied to the first capacitor to maintain ineffective a discharging circuit for the second capacitor, a resistor operatively connected between the output chain of voltage pulses and the second capacitor to render the chain of pulses of the output effective to charge the second capacitor at a relatively slower rate to a predetermined level, and other means effective upon a discontinuance of the charging chain of voltage pulses to discharge said first capacitor so as to cause the switch means to thereafter render effective the discharging circuit for the second capacitor upon a discontinuance of the chain of voltage pulses.

6. The combination defined by claim 5 in which the means to operatively connect the first capacitor to the output chain of voltage pulses includes a diode and the other means includes a resistor connected in parallel with the diode, the diode being arranged to effect a rapid charging of the first capacitor upon the chain of output voltage pulses being applied therethrough and the resistor being arranged to delay a discharge of the first capacitor by a reverse flow of current therethrough between voltage pulses of said chain so that the switch means in response to the charge applied to said first capacitor may continue to maintain the discharging circuit for said second capacitor ineffective so long as the chain of output voltage pulses may continue, and said last mentioned resistor being thereafter effective upon a discontinuance of the charging chain of voltage pulses to permit the first capacitor to discharge therethrough so as to cause the switch means to thereafter render effective the discharging circuit for the second capacitor.

7. The improvement defined by claim 1 in which the threshold detector includes a field effect transistor having a drain element, a source element and a gate element, a source of electrical energy, a first resistor connecting a positive terminal of the source of electrical energy to the drain element of the field effect transistor, a Zener diode having a cathode element connected to the source element of the field effect transistor, the Zener diode having an anode element connected to a negative terminal of the source of electrical energy, the sample and hold network having an output voltage operatively connected across the gate element of the field effect transistor and the anode element of the Zener diode, a second resistor connecting the positive terminal of the source of electrical energy to the cathode element of the Zener diode, the Zener diode having a predetermined reverse current breakdown characteristic such that upon the conductivity of the field effect transistor between the drain and source elements being effectively increased upon the output voltage applied across the gate element of the field effect transistor and the anode element of the Zener diode exceeding a predetermined critical value a reverse flow of current may be effected from the cathode element to the anode element of the Zener diode to initiate a firing of the field effect transistor, and output signal means connected across the drain element of the field effect transistor and the anode element of the Zener diode for operating the monitor means in response to the firing of the field effect transistor.

8. The improvement defined by claim 1 in which the sample and hold network includes a first capacitor, means to operatively connect the first capacitor to the output of the amplifying means so as to effect a charging of the first capacitor at a relatively rapid rate by a leading edge of a voltage pulse of the chain of pulses at said output, a second capacitor, a switch means controlled by the charge applied to the first capacitor to maintain ineffective a discharging circuit for the second capacitor, a resistor operatively connected between the output of the amplifying means and the second capacitor to render the chain of pulses at the output effective to charge the second capacitor at a relatively slower rate to a predetermined level at which the threshold detector becomes effective, other means effective upon a discontinuance of the charging chain of voltage pulses to discharge said first capacitor so as to cause the switch means to thereafter render effective the discharging circuit for the second capacitor upon a discontinuance of the chain of voltage pulses; and the threshold detector includes a field effect transistor having a drain element, a source element and a gate element, a source of electrical energy, a first resistor connecting a positive terminal of the source of electrical energy to the drain element of the field effect transistor, a Zener diode having a cathode element connected to the source element of the field effect transistor, the Zener diode having an anode element connected to a negative terminal of the source of electrical energy, the sample and hold network having an output voltage controlled by the charge applied to the second capacitor and operatively connected across the gate element of the field effect transistor and the anode element of the Zener diode, a second resistor connecting the positive terminal of the source of electrical energy to the cathode element of the Zener diode, the Zener diode having a predetermined reverse current breakdown characteristic such that upon the conductivity of the field effect transistor between the drain and source elements being effectively increased upon the output voltage applied across the gate element of the field effect transistor and the anode element of the Zener diode being increased to said predetermined level there may be effected the reverse flow of current from the cathode element to the anode element of the Zener diode to initiate a firing of the field effect transistor, and output signal means connected across the drain element of the field effect transistor and the anode element of the Zener diode for operating the monitor means in response to the firing of the field effect transistor.

9. The combination defined by claim 5 including a threshold detector, said threshold detector comprising a field effect transistor having a drain element, a source element, and a gate element, first means connecting a plate of the second capacitor to the gate element, second means connecting another plate of the second capacitor to the source element of the field effect transistor, the second means having a substantially constant threshold potential below which it is non-conductive in a reverse current direction and above which it is conductive in a reverse current direction, other means for biasing the second means in said reverse current direction, and said field effect transistor applying an additional biasing force to said second means in said reverse current direction upon the charge applied to said second capacitor reaching said predetermined level to cause said gate element to effect a firing of the field effect transistor and a reverse flow of current through said second means in the reverse current direction, and monitor means responsive to the firing of the field effect transistor and the reverse flow of current through said second means.

10. The combination defined by claim 5 including a threshold detector, said threshold detector comprising a current flow control device, control means for the control device, means for operatively connecting the control means for the control device across the second capacitor, the last mentioned connecting means including a unidirectional current flow control element having a substantially constant threshold potential below which the control element is non-conductive in a reverse current direction and above which the control element is conductive in a reverse current direction, and said current flow control device being fired upon a reverse flow of current being effected through said control element on the charge applied to said second capacitor exceeding said threshold potential, and monitor means responsive to the firing of the current flow control device.

References Cited

UNITED STATES PATENTS

| | | | |
|---|---|---|---|
| 2,995,687 | 8/1961 | Mayberry | 307—235 |
| 3,177,377 | 4/1965 | Brown | 307—235 |
| 3,191,066 | 6/1965 | Staudenmayer | 307—234 XR |

ARTHUR GAUSS, *Primary Examiner.*

STANLEY D. MILLER, *Assistant Examiner.*

U.S. Cl. X.R.

307—246, 251, 293; 328—148, 151; 340—248